(12) United States Patent
Park et al.

(10) Patent No.: US 11,749,462 B2
(45) Date of Patent: Sep. 5, 2023

(54) MULTILAYER CERAMIC ELECTRONIC COMPONENT AND BOARD HAVING THE SAME MOUNTED THEREON

(71) Applicant: SAMSUNG ELECTRO-MECHANICS CO., LTD., Suwon-si (KR)

(72) Inventors: Heung Kil Park, Suwon-si (KR); Gu Won Ji, Suwon-si (KR); Sang Soo Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 57 days.

(21) Appl. No.: 17/537,838

(22) Filed: Nov. 30, 2021

(65) Prior Publication Data
US 2022/0216010 A1 Jul. 7, 2022

(30) Foreign Application Priority Data
Jan. 5, 2021 (KR) .......................... 10-2021-0001111

(51) Int. Cl.
*H01G 4/30* (2006.01)
*H01G 4/012* (2006.01)
(Continued)

(52) U.S. Cl.
CPC .............. *H01G 4/30* (2013.01); *H01G 2/065* (2013.01); *H01G 4/012* (2013.01); *H01G 4/12* (2013.01); *H01G 4/224* (2013.01); *H01G 4/232* (2013.01)

(58) Field of Classification Search
CPC .......... H01G 4/224; H01G 4/248; H01G 4/30; H01G 4/38; H01G 4/012; H01G 4/1227;
(Continued)

(56) References Cited

U.S. PATENT DOCUMENTS 10,056,193 B1 * 8/2018 Son ........................ H01G 4/232
2010/0123995 A1 5/2010 Otsuka et al.
(Continued)

FOREIGN PATENT DOCUMENTS

JP 3847265 B2 11/2006
JP 2010-123614 A 6/2010
(Continued)

Primary Examiner — Michael P McFadden
(74) Attorney, Agent, or Firm — Morgan, Lewis & Bockius LLP (57) ABSTRACT

A multilayer ceramic electronic component includes a multilayer capacitor including a capacitor body, and first and second external electrodes disposed on both side surfaces of the capacitor body, respectively; first and second metal frames disposed on both side surfaces and upper and lower surfaces of the multilayer capacitor; and an exterior insulating portion disposed to surround upper surfaces of the multilayer capacitor and the first and second metal frames. A shortest distance from an upper end of the exterior insulating portion to the external electrodes is defined as G1, a shortest distance from a lower end of the exterior insulating portion to the external electrodes is defined as G2, a maximum distance from upper ends of the external electrodes to lower ends is defined as T, and G1, G2, and T satisfy $G1 \leq G2 \leq T/2$.

13 Claims, 5 Drawing Sheets

(51) Int. Cl.
*H01G 2/06* (2006.01)
*H01G 4/12* (2006.01)
*H01G 4/224* (2006.01)
*H01G 4/232* (2006.01)

(58) Field of Classification Search
CPC .... H01G 4/1245; H01G 4/065; H01G 4/0085;
H01G 4/232; H01G 4/40; H01G 4/12;
H05K 1/0231
See application file for complete search history.

(56) References Cited

U.S. PATENT DOCUMENTS

| | | | |
|---|---|---|---|
| 2015/0014038 A1* | 1/2015 | Park | H01G 4/248 |
| | | | 361/301.4 |
| 2016/0219739 A1* | 7/2016 | Park | H01G 4/30 |
| 2017/0164479 A1* | 6/2017 | Park | H01G 2/065 |
| 2018/0240596 A1 | 8/2018 | Son | |
| 2019/0124771 A1* | 4/2019 | Park | H01G 4/2325 |
| 2020/0058448 A1* | 2/2020 | Cho | H01G 4/38 |
| 2020/0075262 A1* | 3/2020 | Cho | H01G 4/232 |

FOREIGN PATENT DOCUMENTS

| | | |
|---|---|---|
| JP | 2011-071220 A | 4/2011 |
| KR | 10-1508539 B1 | 4/2015 |
| KR | 10-1901704 B1 | 9/2018 |

\* cited by examiner

MULTILAYER CERAMIC ELECTRONIC COMPONENT AND BOARD HAVING THE SAME MOUNTED THEREON

CROSS-REFERENCE TO RELATED APPLICATION(S)

This application claims benefit of priority to Korean Patent Application No. 10-2021-0001111 filed on Jan. 5, 2021 in the Korean Intellectual Property Office, the disclosure of which is incorporated herein by reference in its entirety.

TECHNICAL FIELD

The present disclosure relates to a multilayer ceramic electronic component and a board having the same mounted thereon.

BACKGROUND

A multilayer ceramic capacitor (MLCC), a multilayer chip electronic component, has been used in various electronic devices as a multilayer capacitor may be small-sized, may secure high capacity, and may be easily mounted.

A multilayer capacitor may have a structure in which a plurality of dielectric layers are provided, and internal electrodes having different polarities are alternately disposed between the dielectric layers.

Since the dielectric layer has piezoelectricity, a piezoelectric phenomenon may occur between internal electrodes when a direct or alternating voltage is applied to the multilayer capacitor, such that a volume of a capacitor body may expand or reduce according to a frequency, and periodic vibrations may be generated.

Such vibrations may be transmitted to a board through an external electrode of the multilayer capacitor and a solder connecting the external electrode to the board, such that the entire board may become an acoustic reflective surface, and vibration sound, noise, may be generated.

Such vibration sound may be an audible frequency in the range of 20 to 20,000 Hz causing discomfort to listeners, and such vibration sound causing discomfort to listeners is known as acoustic noise.

In recent electronic devices, since mechanical components have been designed to be silenced, acoustic noise generated by the multilayer ceramic capacitor as above may appear more prominently.

As for such an acoustic noise disturbance, a user may recognize the acoustic noise as a malfunction of the device when an operating environment of the device is quiet.

Also, in a device having an audio circuit, acoustic noise may be superimposed on an audio output, such that the quality of the device may degrade.

Apart from the acoustic noise perceived by human ears, when piezoelectric vibration of a multilayer capacitor occurs in a high frequency range of 20 kHz or higher, the vibration may cause malfunction of various sensors used in the fields of IT and industrial/vehicle components.

SUMMARY

An aspect of the present disclosure is to provide a multilayer ceramic electronic component which have reduced acoustic noise and reduced high frequency vibration of 20 kHz or higher, and a board having the same mounted thereon.

According to an aspect of the present disclosure, a multilayer ceramic electronic component includes a multilayer capacitor including a capacitor body including a plurality of dielectric layers and first and second internal electrodes alternately disposed in a first direction towards a mounting surface with one of the plurality of dielectric layers interposed therebetween, and first and second external electrodes disposed on both side surfaces of the capacitor body, respectively; first and second metal frames including first and second terminal portions disposed on a mounting surface side of the capacitor body, first and second horizontal portions disposed to oppose the first and second terminal portions with the capacitor body interposed therebetween, respectively, and connected to the first and second external electrodes on a surface opposing the mounting surface of the capacitor body, respectively, and first and second vertical portions connecting the first and second terminal portions to the first and second horizontal portions, respectively; and an exterior insulating portion disposed to surround the multilayer capacitor and the first and second horizontal portions of the first and second metal frames. A shortest distance from an upper end of the exterior insulating portion to the first and second external electrodes is defined as G1, a shortest distance from a lower end of the exterior insulating portion to the first and second external electrodes is defined as G2, a maximum distance from upper ends of the first and second external electrodes to lower ends is defined as T, and G1, G2, and T satisfy $G1 \le G2 \le T/2$.

In the first and second metal frames, the first and second vertical portions and the first and second terminal portions may be spaced apart from the exterior insulating portion by a predetermined distance.

In the first and second metal frames, first and second groove portions may be disposed in portions connecting the first and second horizontal portions to the first and second vertical portions, respectively.

The first and second horizontal portions of the first and second metal frames may be connected to the first and second external electrodes of the multilayer capacitor by a conductive adhesive layer, respectively.

The first and second vertical portions and the first and second terminal portions of the first and second metal frames may be configured to be bent along a shape of the exterior insulating portion.

According to an aspect of the present disclosure, a board having a multilayer ceramic electronic component mounted thereon includes a board having first and second electrode pads on an upper portion thereof; and a multilayer electronic component including first and second metal frames connected to and mounted on the first and second electrode pads, respectively.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

Shapes and sizes of elements in the drawings may be exaggerated for clarity of description, and elements indicated by the same reference numeral are same elements in the drawings.

A multilayer ceramic electronic component in the example embodiment may include a multilayer capacitor, first and second metal frames, and an exterior insulating portion.

Figure 1:
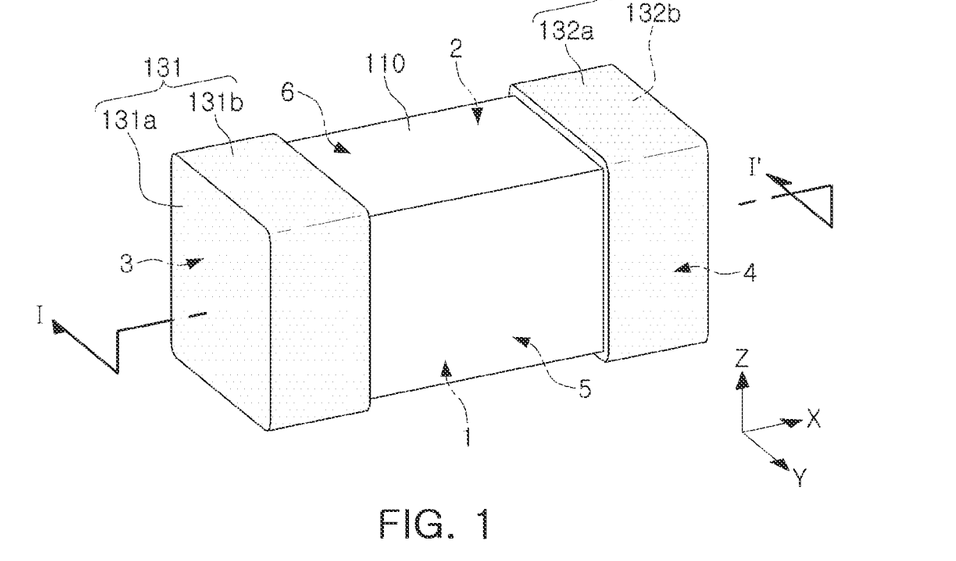
FIG. 1 is a perspective diagram illustrating a multilayer capacitor according to an example embodiment of the present disclosure.
Figure 2A:
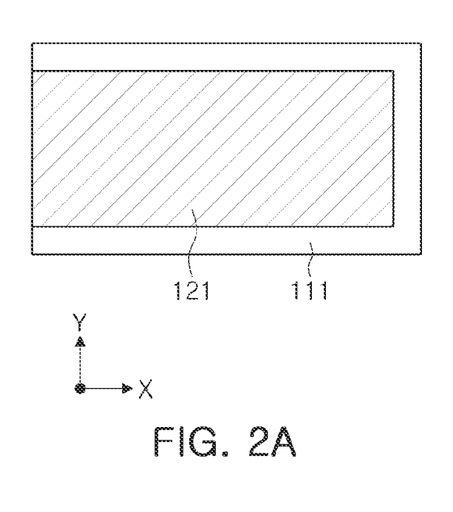
FIGS. 2A and 2B are plan diagrams illustrating a structure of first and second internal electrodes of the multilayer capacitor illustrated in FIG. 1.
Figure 2B:
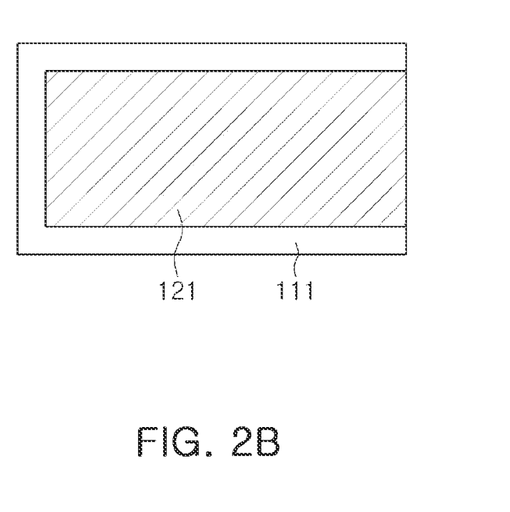
Figure 3:
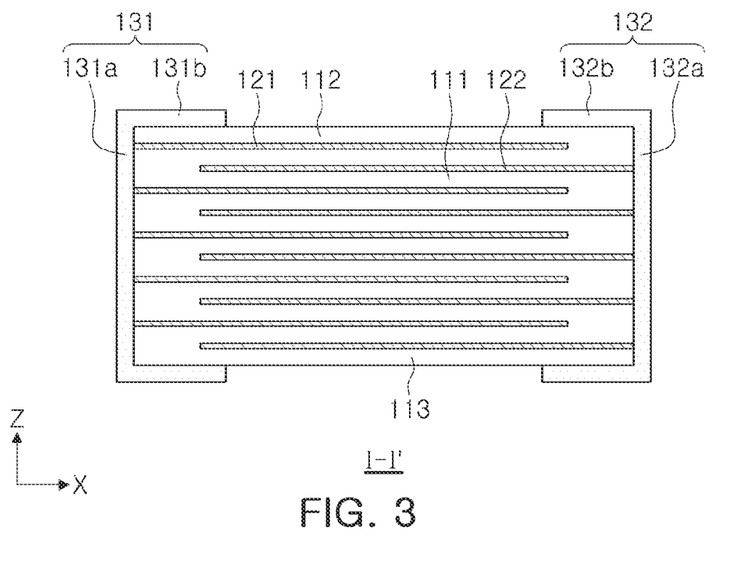
FIG. 3 is a cross-sectional diagram taken along line I-I' in FIG. 1.

Referring to FIGS. 1 to 3, the multilayer capacitor 100 in the example embodiment may include a capacitor body 110 and first and second external electrodes 131 and 132.

The capacitor body 110 may include a plurality of dielectric layers 111 and a plurality of first internal electrodes 121 and second internal electrodes 122 alternately disposed in the Z direction with the dielectric layer 111 interposed therebetween.

The capacitor body 110 may be obtained by laminating the plurality of dielectric layers 111 in the Z direction and sintering the dielectric layers, and boundaries between the dielectric layers 111 of the capacitor body 110 adjacent to each other may be integrated such that it may be difficult to identify the boundaries without using a scanning electron microscope (SEM).

The capacitor body 110 may have a substantially hexahedral shape, but an example embodiment thereof is not limited thereto. Also, the shape and dimensions of the capacitor body 110 and the number of laminated dielectric layers 111 are not limited to the examples illustrated in the drawings.

In the example embodiment, both surfaces of the capacitor body 110 opposing each other in the Z direction may be defined as first and second surfaces 1 and 2, both surfaces connected to the first and second surfaces 1 and 2 and opposing each other in the X direction may be defined as third and fourth surfaces 3 and 4, and both surfaces connected to the first and second surfaces 1 and 2 and the third and fourth surfaces 3 and 4 and opposing each other in the Y direction may be defined as fifth and sixth surfaces 5 and 6.

In the example embodiment, the mounting surface of the multilayer capacitor 100 may be the first surface 1 of the capacitor body 110.

The dielectric layers 111 may include a high-k ceramic material, barium titanate ($BaTiO_3$) or strontium titanate ($SrTiO_3$) ceramic powder, for example, but an example embodiment thereof is not limited thereto as long as sufficient capacitance is able to be obtained.

The dielectric layers 111 may further include ceramic additives, organic solvents, plasticizers, binders, and dispersants in addition to ceramic powder.

As the ceramic additives, a transition metal oxide or a transition metal carbide, a rare earth element, magnesium (Mg) or aluminum (Al) may be used.

The capacitor body 110 may include an active region contributing to the formation of capacitance of the capacitor, and upper and lower covers 112 and 113 formed above and below the active region in the Z direction as upper and lower margin portions.

The upper and lower covers 112 and 113 may have a material and a configuration the same as those of the first and second dielectric layers 111 and 112 other than the configuration in which the upper and lower covers do not include internal electrodes.

The upper and lower covers 112 and 113 may be formed by laminating a single dielectric layer or two or more dielectric layers on upper and lower surfaces of the active region in the Z direction, respectively, and may prevent damages to the first and second internal electrodes 121 and 122 caused by physical or chemical stress.

Thicknesses of the upper and lower covers 112 and 113 may be equal to or greater than a predetermined level of thickness to prevent damage to the capacitor body 110 caused by external impacts, or the like.

The first and second internal electrodes 121 and 122 may be applied with different polarities, and may be alternately disposed in the Z direction with the dielectric layer 111 interposed therebetween, and one ends thereof may be exposed to the third and fourth surfaces 3 and 4 of the capacitor body 110, respectively.

In this case, the first and second internal electrodes 121 and 122 may be electrically insulated from each other by the dielectric layer 111 disposed therebetween.

Accordingly, the ends of the first and second internal electrodes 121 and 122, alternately exposed through the third and fourth surfaces 3 and 4 of the capacitor body 110, may be electrically connected to the first and second external electrodes 130 and 140 disposed on the third and fourth surfaces 3 and 4 of the capacitor body 110, respectively.

By the above configuration, when a predetermined voltage is applied to the first and second external electrodes 130 and 140, electric charges may be accumulated between the first and second internal electrodes 121 and 122.

In this case, capacitance of the multilayer capacitor 100 may be proportional to an area of overlap between the first and second internal electrodes 121 and 122, overlapping each other in the Z direction in the active region.

A material for forming the first and second internal electrodes 121 and 122 is not limited to any particular material, and the first and second internal electrodes 121 and 122 may be formed using a conductive paste formed of a noble metal material such as platinum (Pt), palladium (Pd), palladium-silver (Pd—Ag) alloy, and at least one of nickel (Ni) and copper (Cu).

In this case, as the method of printing the conductive paste, a screen printing method or a gravure printing method may be used, and an example embodiment thereof is not limited thereto.

The first and second external electrodes 131 and 132 may be formed by sintering a conductive paste including copper (Cu), used for external electrodes, to have improved electrical properties and to provide improved reliability such as excellent heat cycle resistance and moisture resistance, but an example embodiment thereof is not limited thereto.

The first and second external electrodes 131 and 132 may include first and second connection portions 131a and 132a and first and second band portions 131b and 132b, respectively.

The first and second connection portions 131a and 132a may cover the third and fourth surfaces 3 and 4 of the capacitor body 110 formed in the X direction, respectively, and may be electrically connected to exposed ends of the first and second internal electrodes 121 and 122, respectively.

The first and second band portions 131b and 132b may be configured to extend from the first and second connection portions 131a and 132a to cover a portion of a circumferential surface of the capacitor body 110.

Plating layers (not illustrated) may be formed on the first and second external electrodes 131 and 132.

The plating layers may include, for example, first and second nickel (Ni) plating layers formed on the first and second external electrodes 131 and 132, respectively, and first and second tin (Sn) plating layers formed on the first and second nickel plating layers, respectively.

Figure 4:
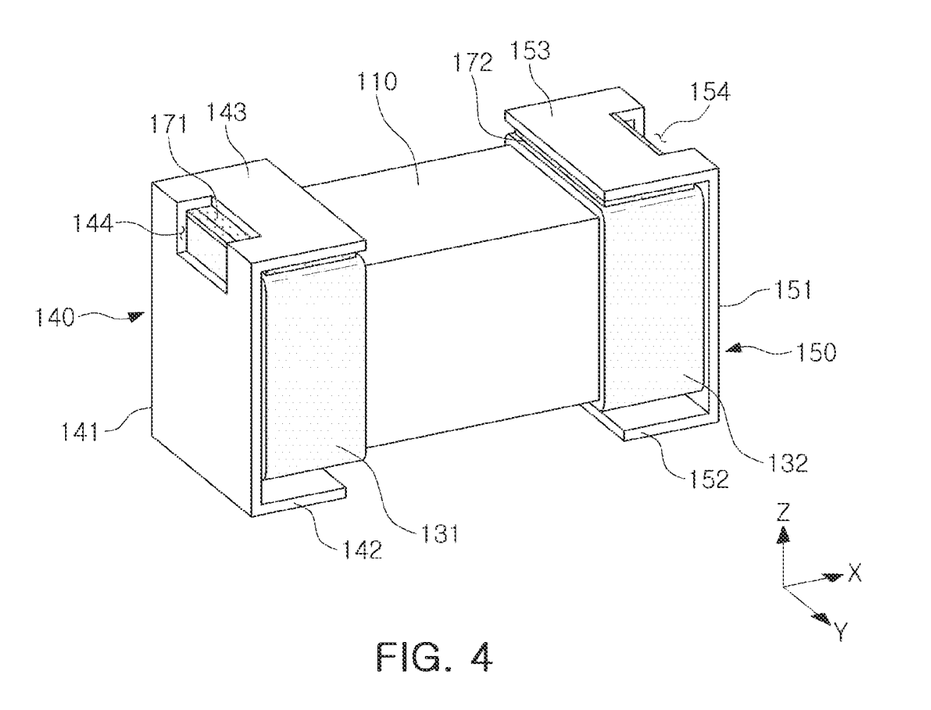
FIG. 4 is a perspective diagram illustrating an example in which the multilayer capacitor illustrated in FIG. 1 is installed in first and second metal frames.
Figure 5:
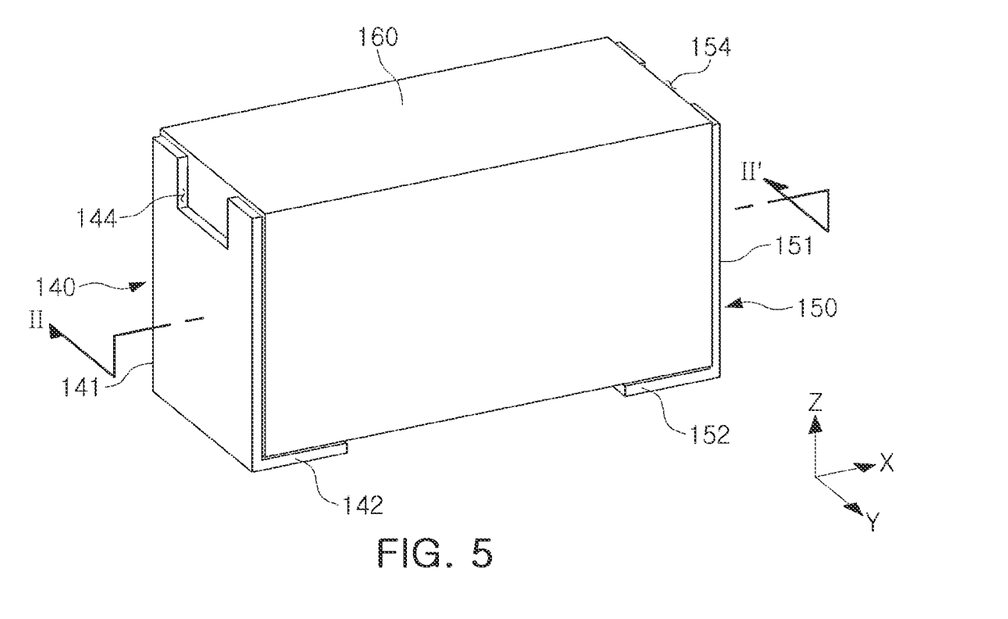
FIG. 5 is a perspective diagram illustrating a multilayer ceramic electronic component in which an exterior insulating portion is formed in the example illustrated in FIG. 4.
Figure 6:
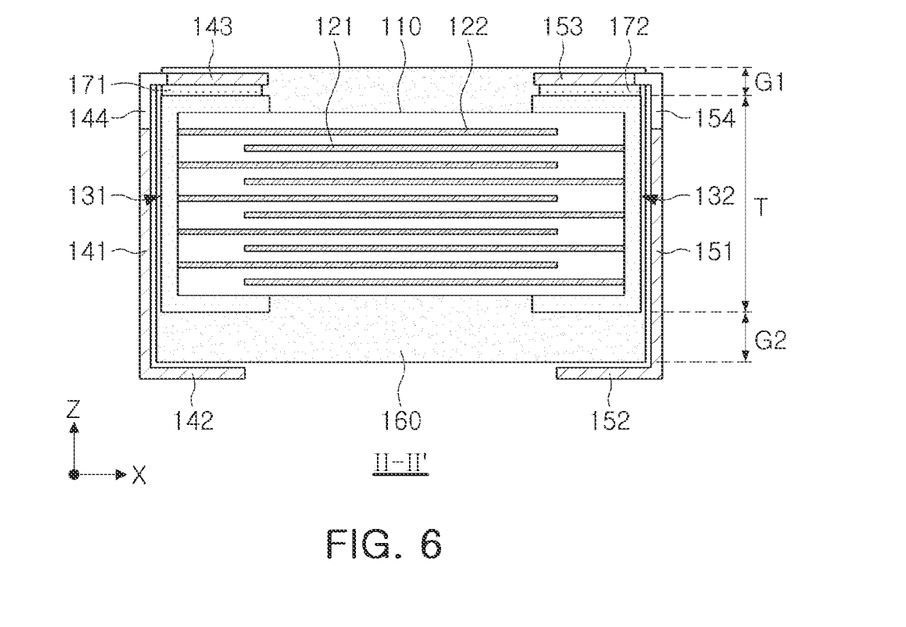
FIG. 6 is a cross-sectional diagram taken along line II-II' in FIG. 5.
Figure 7:
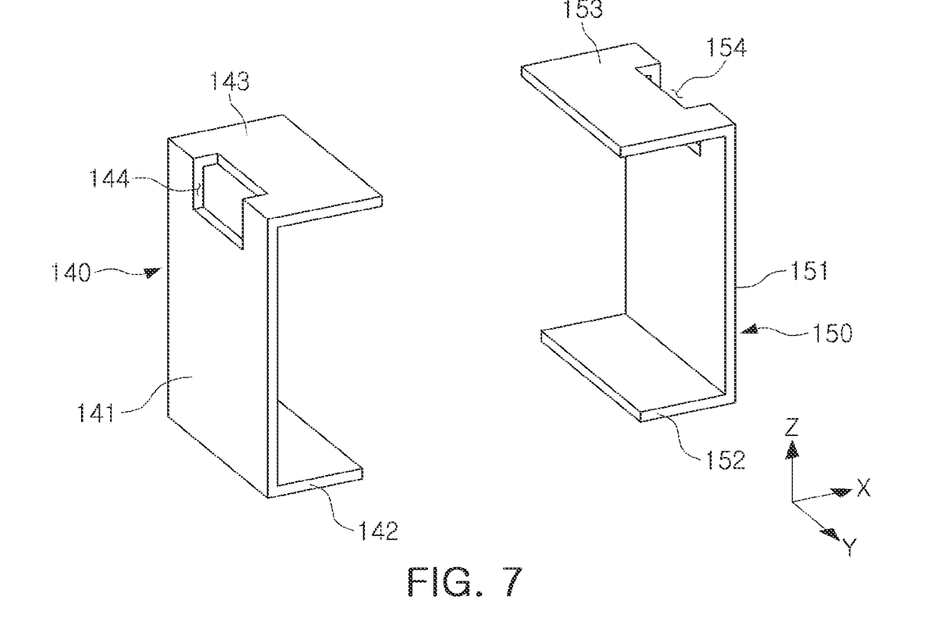
FIG. 7 is a perspective diagram illustrating an example in which first and second metal frames are separated from each other in the example in FIG. 4.

FIG. 4 is a perspective diagram illustrating an example in which the multilayer capacitor illustrated in FIG. 1 is installed in first and second metal frames. FIG. 5 is a perspective diagram illustrating a multilayer ceramic electronic component in which an exterior insulating portion is formed in the example illustrated in FIG. 4. FIG. 6 is a cross-sectional diagram taken along line II-II' in FIG. 5. FIG. 7 is a perspective diagram illustrating an example in which first and second metal frames are separated from each other in the example in FIG. 4.

Referring to FIGS. 4 to 7, a multilayer ceramic electronic component according to the example embodiment may include a multilayer capacitor 100, first and second metal frames 140 and 150 disposed on both side surfaces and upper and lower surfaces of the multilayer capacitor 100, and an exterior insulating portion 160 disposed to surround upper surfaces of the multilayer capacitor 100 and the first and second metal frames 140 and 150.

The first and second metal frames 140 and 150 may have side surfaces and lower surfaces spaced apart from the exterior insulating portion 160 by a predetermined distance. Accordingly, by absorbing piezoelectric vibration by an elastic force of the first and second metal frames 140 and 150, acoustic noise may be reduced.

Surfaces of the first and second metal frames 140 and 150 may be plated for smooth solderability.

Also, side surfaces and lower surfaces of the first and second metal frames 140 and 150 may be configured to be bent along the exterior insulating portion 160.

The first metal frame 140 may have a "⊏" shape including a first terminal portion 142, a lower surface, a first horizontal portion 143, an upper surface, and a first vertical portion 141, a side surface.

The first terminal portion 142 may be disposed on the first surface 1 side, the mounting surface of the capacitor body 110, and may work as amounting surface with respect to the board.

The first horizontal portion 143 may be disposed to oppose the first terminal portion 142 in the Z direction with the capacitor body 110 interposed therebetween, and may be connected to the upper first band portion 131b of the first external electrode 131 on the second surface 2 opposing the first surface 1, the mounting surface, of the capacitor body 110 in the Z direction.

In this case, a first conductive bonding layer 171 may be disposed between the first horizontal portion 143 and the first band portion 131b. The first conductive bonding layer 171 may be formed of high-temperature solder or a conductive resin paste.

The first vertical portion 141 may connect the end of the first terminal portion 142 to the end of the first horizontal portion 143, and may be disposed to oppose the first connection portion 131a of the first external electrode 131 in the X direction, and may extend a vibration transmission path through which vibration is transmitted to the board, thereby improving the effect of reducing acoustic noise.

The second metal frame 150 may have a "]" shape including a second terminal portion 152, a lower surface, a second horizontal portion 153, an upper surface, and a second vertical portion 151, a side surface.

The second terminal portion 152 may be disposed on the first surface 1 side, the mounting surface of the capacitor body 110, and may work as a mounting surface with respect to the board.

The second horizontal portion 153 may be disposed to oppose the second terminal portion 152 in the Z direction with the capacitor body 110 interposed therebetween, and may be connected to the upper second band portion 132 of the second external electrode 132 on the second surface 2 opposing the first surface 1, the mounting surface, of the capacitor body 110 in the Z direction.

In this case, a second conductive bonding layer 172 may be disposed between the second horizontal portion 153 and the second band portion 132b. The second conductive bonding layer 172 may be formed of high-temperature solder or a conductive resin paste.

The second vertical portion may connect the end of the second terminal portion to the end of the second horizontal portion, may be disposed to oppose the second connection portion 132a of the second external electrode 132 in the X direction, and may extend a vibration transmission path through which vibration is transmitted to the board, thereby improving the effect of reducing acoustic noise.

In the first metal frame 140, a first groove portion 144 may be formed in a portion connecting the first horizontal portion 143 to the first vertical portion 141.

In the second metal frame 150, a second groove portion 154 may be formed in a portion connecting the second horizontal portion 153 to the second vertical portion 151.

The first and second groove portions 144 and 154 may reduce contact areas between the first and second metal frames 140 and 150 and the first and second band portions 131b of the first and second external electrodes 131 and 132 such that vibration transmitted from the first and second external electrodes 131 and 132 may be reduced.

Also, by including the first and second groove portions 144 and 154, in the process of bending the first and second metal frames 140 and 150 towards the first and second vertical portions 141 and 151, an area of metal to be bent may be reduced by the first and second groove portions 144 and 154 such that the bending process may be easily performed with relative small force.

The exterior insulating portion 160 may be disposed to surround the entire multilayer capacitor 100 and the first and second horizontal portions 143 and 153 of the first and second metal frames 140 and 150. Although not shown in the drawings, in one example, the exterior insulating portion 160 may be disposed to surround the first and second horizontal portions 143 and 153 of the first and second metal frames 140 and 150 and the entire multilayer capacitor 100 except a portion of the first connection portion 131a of the multilayer capacitor 100 facing the first vertical portion 141 and a portion of the second connection portion 132a of the multilayer capacitor 100 facing the second vertical portion 142.

The exterior insulating portion 160 may be formed of an insulator such as epoxy, and may prevent permeation of moisture or may mitigate external impacts applied to the multilayer capacitor 100, thereby improving reliability of the multilayer capacitor 100.

In the multilayer ceramic electronic component having such the above-described structure in the example embodiment, the "⊏" shaped metal frame may be configured to be bonded to the horizontal mounting type multilayer capacitor.

Also, the vertical portions and the terminal portions of the metal frames may be spaced apart from the multilayer capacitor, the horizontal portion may be bonded to the upper band portion of the external electrode, and the portion other than the vertical portion and the terminal portion may be enclosed by the exterior insulating portion, thereby improving reliability.

Also, when the electronic component is mounted on the board, by applying the "⊏" shaped metal frame, a long vibration transmission path in which piezoelectric vibration of the multilayer capacitor is transmitted to a circuit board may be formed such that the substantial part of the piezoelectric vibration of the multilayer capacitor may be absorbed by the metal frame while being transmitted. Accordingly, the mount of piezoelectric vibration transmitted to the circuit board may be reduced, thereby reducing acoustic noise.

Also, the multilayer capacitor may be configured as a horizontal mounting type which may be disposed horizontally with respect to the mounting surface of the board, and the vibration displacement of the multilayer capacitor may decrease toward both ends, thereby reducing the transmission of vibration displacement to the board when the board is bonded with the metal frame.

Accordingly, malfunction of various sensors caused by a high-frequency vibration of 20 kHz or higher of a multilayer capacitor may be prevented in the fields of IT and industrial/vehicle components.

Further, by reducing the high-frequency vibration, accumulation of internal fatigue of sensors caused by vibration generated for a long time may be prevented, and vibration with a large wavelength in an audible frequency within 20 kHz may be also prevented such that acoustic noise may be reduced.

Figure 8:
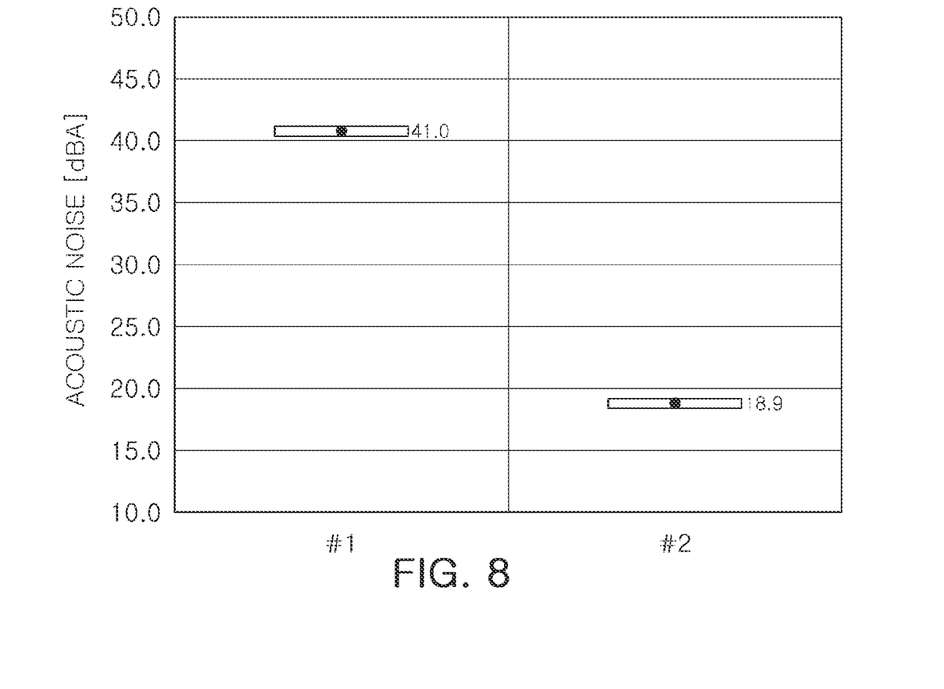
FIG. 8 is a graph illustrating a comparison of acoustic noise of an electronic component through a comparative example and an example embodiment.

FIG. 8 is a graph illustrating a comparison of acoustic noise of an electronic component through a comparative example and an example embodiment.

In FIG. 8, #1 is a general two-terminal horizontal mounting type multilayer capacitor, and #2 is a multilayer ceramic electronic component in which the metal frame and the molding portion are applied to the multilayer capacitor of a comparative example. The graph shows the comparison between acoustic noises of #1 and #2.

The multilayer capacitor was tested using a product of 3225 size (length×width×thickness, 3.2 mm×2.5 mm×2.5 mm) and 10 μF.

Referring to FIG. 8, #1 had acoustic noise of 41.0 dBA at average, and #2 had acoustic noise of 18.9 dBA at average. Accordingly, the multilayer ceramic electronic component of the example embodiment had the two times greater effect of reducing acoustic noise than #1.

In the embodiment, a shortest distance from an upper end of the exterior insulating portion 160 to the first and second external electrodes 131 and 132 is defined as G1, a shortest distance from a lower end of the exterior insulating portion 160 to the first and second external electrodes 131 and 132 is defined as G2, and a maximum distance from upper ends of the first and second external electrodes 131 and 132 to lower ends is defined as T, G1, G2, and T may satisfy $G1 \leq G2 \leq T/2$. In one example, G1, G2, and T may be determined in the Z direction. In one example, G1, G2 and T may be determined in a cross-section of the multilayer ceramic electronic component in an X-Z plane cut a central portion of the multilayer ceramic electronic component in the Y direction. The location of the cross-section is not limited to such an example, and one of ordinary skill may select the cross-section at other locations in the multilayer ceramic electronic component, if needed. In one example, an optical microscope or a scanning electron microscope (SEM) may be used in the measurement, although the present disclosure is not limited thereto. Other methods and/or tools appreciated by one of ordinary skill in the art, even if not described in the present disclosure, may also be used. In one example, a distance may be determined by defining a predetermined number (e.g., 5) of points to the left and the predetermined number (e.g., 5) of points to the right from a reference center point of at equal intervals (or non-equal intervals, alternatively), measuring a distance at each of the points at equal intervals (or non-equal intervals, alternatively). The maximum distance or the shortest distance may be determined among the measured distances at the measured points.

The exterior surface of the exterior insulating portion 160 may work as a guide when the first and second metal frames 140 and 150 are bent to have the shapes of "[" and "]", and G2 may determine a spacing between the multilayer capacitor 100 and the board and may thus be an important variable in reducing piezoelectric vibration.

TABLE 1

| # | Dimension (A) | Acoustic Noise | Whether SMT defect occurs |
|---|---|---|---|
| 3 | G1 > G2 | 28.5~30.2 dBA | X |
| 4 | G1 = G2 | 24.3 dBA | X |
| 5 | G1 < G2 < T/2 | 19.4~22.1 dBA | X |
| 6 | G2 = T/2 | 23.5 dBA | X |
| 7 | T/2 < G2 < 2T/3 | 28.1~36.4 dBA | ○ |

Referring to Table 1, in #3 in which G1 was greater than G2, the elastic force of the metal frame was reduced, such that acoustic noise became 28.5 to 30.2 dBA, and a mounting defect did not occur.

As in #4, when G1 was substantially the same as G2, acoustic noise was further lowered to 24.3 dBA, and a mounting defect did not occur.

As in #5, when G2 was greater than G1 and less than T/2, acoustic noise was further lowered to 19.4 to 22.1 dBA, and a mounting defect did not occur.

As in #6, when G2 was substantially equal to T/2, acoustic noise was 23.5 dBA, and a mounting defect did not occur.

As in #7, when T/2 was smaller than G2 and smaller than 2T/3, acoustic noise increased to 28.1 to 36.4 dBA, and the height of the entire component increased, which caused collapse of the chips while being mounted, and the metal frame was also shaken. Accordingly, noise was increased and the mounting defect occurred.

Therefore, to reduce acoustic noise and to prevent the mounting defect, the relationship between the above parameters may need to satisfy G1≤G2≤T/2.

Figure 9:
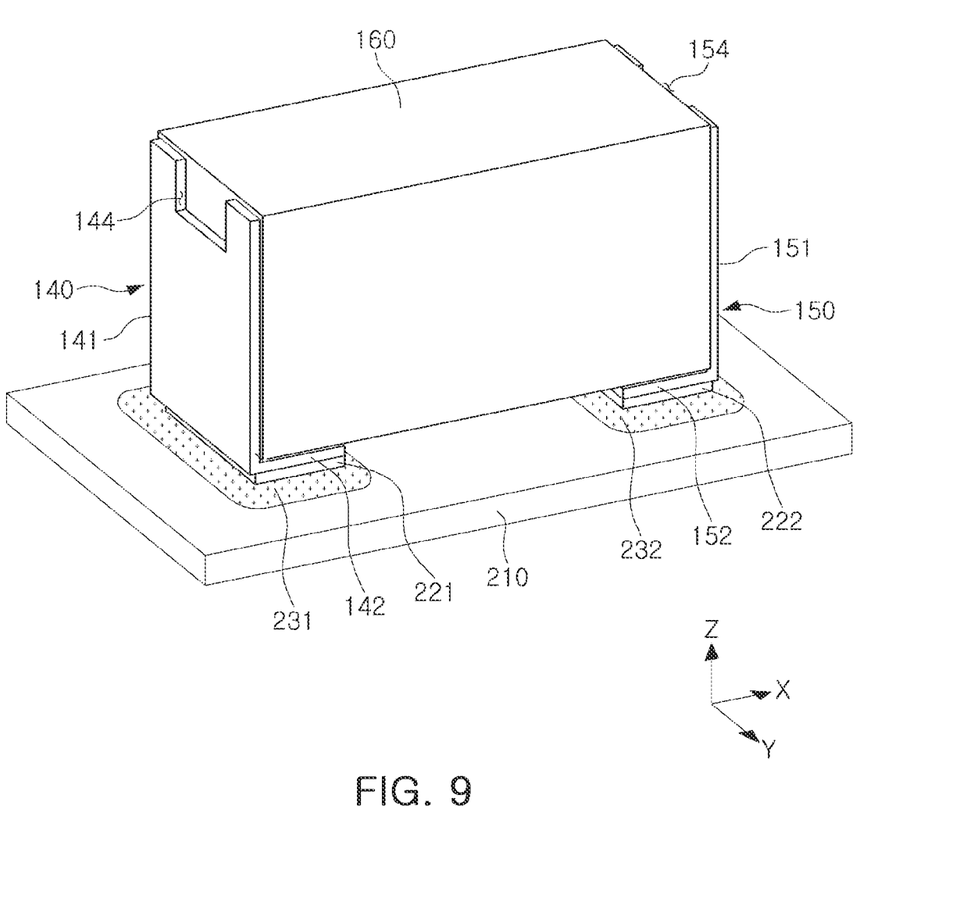
FIG. 9 is a perspective diagram illustrating an example in which the multilayer ceramic electronic component illustrated in FIG. 5 is mounted on a board.

FIG. 9 is a perspective diagram illustrating an example in which the multilayer ceramic electronic component illustrated in FIG. 5 is mounted on a board.

Referring to FIG. 9, a mounting board of the multilayer ceramic electronic component according to the example embodiment may include a board 210 on which the multilayer ceramic electronic component is mounted, and first and second electrode pads 221 and 222 disposed on the upper surface of the board 210 and spaced apart from each other.

The multilayer ceramic electronic component may, while the first and second terminal portions 142 and 152 of the first and second metal frames 140 and 150 are disposed on and in contact with the first and second electrode pads 221 and 222 of the board 210, respectively, be bonded to and electrically connected to the board 210 by solders 231 and 232.

When voltages of different polarities are applied to the first and second external electrodes 131 and 132 of the multilayer capacitor 100 through the first and second metal frames 140 and 150 while the multilayer ceramic electronic component is mounted on the board 210, the capacitor body 110 may expand and may be reduced in the Z direction by an inverse piezoelectric effect, and both ends of the first and second external electrodes 131 and 132 may expand/be reduced in a direction opposite to the direction of the expansion/reduction of the capacitor body 110, the Z direction, by a Poisson effect.

The expansion and reduction of the capacitor body 110 may generate vibration, and the vibration may be transmitted to the board 210 through the external electrode, and acoustic sound may be radiated from the board 210, which may become acoustic noise.

According to the example embodiment, the piezoelectric vibration transmitted to the board through the first and second external electrodes 131 and 132 of the multilayer ceramic electronic component may be absorbed by elasticity of the first and second metal frames 140 and 150, and mechanical stress caused by bending of the board 210 may also be absorbed by the first and second metal frames 140 and 15, thereby reducing acoustic noise of the product.

According to the aforementioned example embodiment, piezoelectric vibration of the multilayer capacitor transmitted to the board at an audible frequency within 20 kHz may be prevented, such that acoustic noise may be reduced, and high frequency vibration caused by high frequency signals of 20 kHz or higher may also be effectively reduced, such that malfunction of sensors on a set may be prevented.

While the example embodiments have been illustrated and described above, it will be apparent to those skilled in the art that modifications and variations could be made without departing from the scope in the example embodiment as defined by the appended claims.

What is claimed is:

1. A multilayer ceramic electronic component, comprising:

a multilayer capacitor including a capacitor body including a plurality of dielectric layers and first and second internal electrodes alternately disposed in a first direction towards a mounting surface with one of plurality of the dielectric layers interposed therebetween, and first and second external electrodes disposed on both side surfaces of the capacitor body, respectively;

first and second metal frames including first and second terminal portions disposed on a mounting surface side of the capacitor body, first and second horizontal portions disposed to oppose the first and second terminal portions with the capacitor body interposed therebetween, respectively, and connected to the first and second external electrodes on a surface opposing the mounting surface of the capacitor body, respectively, and first and second vertical portions connecting the first and second terminal portions to the first and second horizontal portions, respectively; and an exterior insulating portion disposed to surround the multilayer capacitor and the first and second horizontal portions of the first and second metal frames, wherein a shortest distance from an upper end of the exterior insulating portion to the first and second external electrodes is defined as G1, a shortest distance from a lower end of the exterior insulating portion to the first and second external electrodes is defined as G2, a maximum distance from an upper end of the first and second external electrodes to a lower end in the first direction is defined as T, and G1, G2, and T satisfy G1≤G2≤T/2.

2. The multilayer ceramic electronic component of claim 1, wherein, in the first and second metal frames, the first and second vertical portions and the first and second terminal portions are spaced apart from the exterior insulating portion.

3. The multilayer ceramic electronic component of claim 1, wherein, in the first and second metal frames, first and second groove portions are disposed in portions connecting the first and second horizontal portions to the first and second vertical portions, respectively.

4. The multilayer ceramic electronic component of claim 1, wherein, in the first and second metal frames, a side surface and a lower surface thereof are spaced apart from the exterior insulating portion, and first and second groove portions are disposed in portions connecting the first and second horizontal portions to the first and second vertical portions, respectively.

5. The multilayer ceramic electronic component of claim 1, wherein the first and second horizontal portions of the first and second metal frames are connected to the first and second external electrodes of the multilayer capacitor by a conductive adhesive layer, respectively.

6. The multilayer ceramic electronic component of claim 1, wherein the first and second vertical portions and the first and second terminal portions of the first and second metal frames are configured to be bent along a shape of the exterior insulating portion.

7. A board having a multilayer ceramic electronic component mounted thereon, the board comprising:

a board having first and second electrode pads on an upper portion thereof; and the multilayer electronic component of claim 1 including the first and second metal frames connected to and mounted on the first and second electrode pads, respectively.

8. The board of claim 7, wherein, in the first and second metal frames, the first and second vertical portions and the first and second terminal portions are spaced apart from the exterior insulating portion.

9. The board of claim 7, wherein, in the first and second metal frames, first and second groove portions are disposed in portions connecting the first and second horizontal portions to the first and second vertical portions, respectively.

10. The board of claim 7, wherein, in the first and second metal frames, a side surface and a lower surface thereof are spaced apart from the exterior insulating portion, and first and second groove portions are disposed in portions connecting the first and second horizontal portions to the first and second vertical portions, respectively.

11. The board of claim 7, wherein the first and second horizontal portions of the first and second metal frames are connected to the first and second external electrodes of the multilayer capacitor by a conductive adhesive layer, respectively.

12. The board of claim 7, wherein the first and second vertical portions and the first and second terminal portions of the first and second metal frames are configured to be bent along a shape of the exterior insulating portion.

13. The multilayer ceramic electronic component of claim 1, wherein the first and second horizontal portions have respective lengths in a second direction, perpendicular to the first direction, which are greater than respective lengths of the first and second terminal portions in the second direction.

\* \* \* \* \*